July 16, 1963 H. L. GILLESPIE 3,097,704
NOTCHED TILLAGE DISC WITH RADIALLY PROJECTING TEETH
Filed July 30, 1962
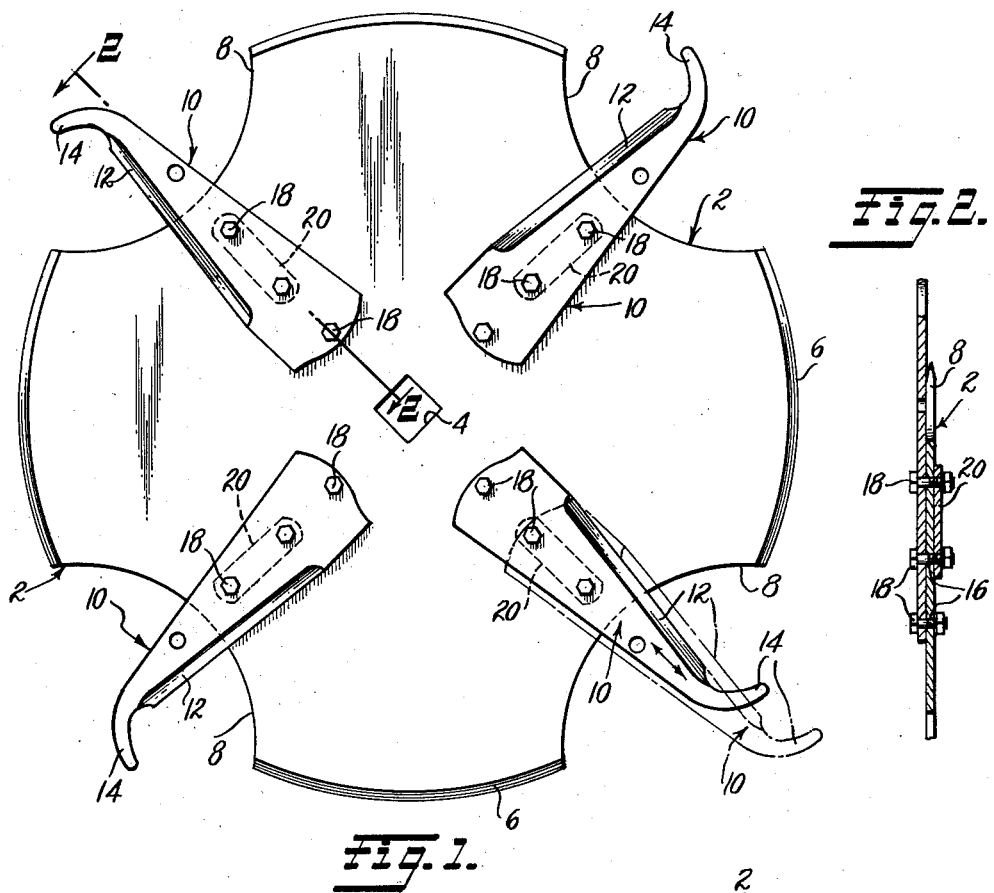
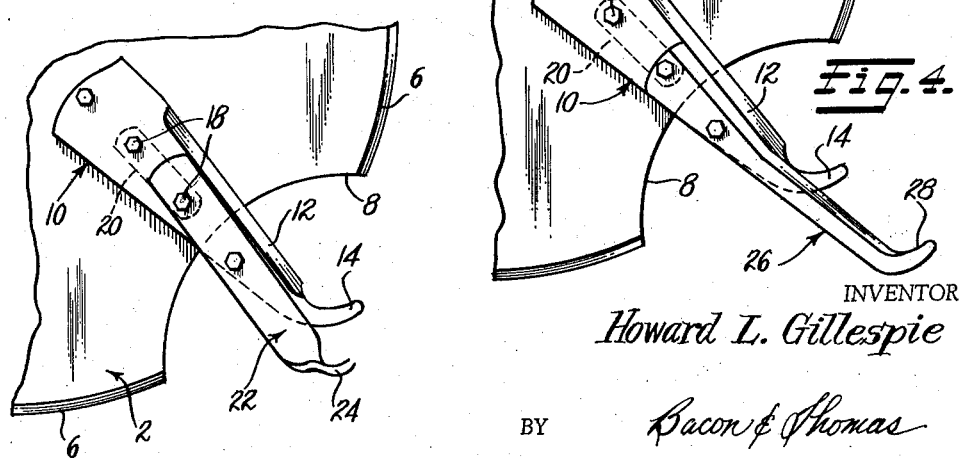
INVENTOR
Howard L. Gillespie
BY Bacon & Thomas
ATTORNEYS

United States Patent Office 3,097,704
Patented July 16, 1963

3,097,704
NOTCHED TILLAGE DISC WITH RADIALLY
PROJECTING TEETH
Howard L. Gillespie, 415 E. Steadman, Anthony, Kans.
Filed July 30, 1962, Ser. No. 213,264
1 Claim. (Cl. 172—540)

This invention relates to soil-working tools and particularly to a harrow disc combined with a further soil tillage device.

In brief, the invention comprises a more or less conventional harrow disc having a scalloped periphery, that is with relatively wide notches cut into its periphery, and with chisel means secured to the disc to project radially therefrom through the central portions of the notches. The chisels extend outwardly at least to the periphery of the disc and preferably somewhat beyond that point so as to enhance the operation of the disc itself and to further agitate and aerate the subsoil while discing the surface soil. An ordinary disc harrow operates on the principle of cutting action applied to the surface of the soil, partially shredding surface vegetation and embedding such vegetation in the soil to help halt erosion and to improve the humus content of the soil. The ordinary subsoil chisel is designed and operated for breaking up a tight soil or for penetrating the soil deeply enough to destroy the surface pans. The invention herein combines the function of both the disc harrow and subsoil chisel to perform both of the above-noted functions in a single operation. The slicing action of the disc in conjunction with the chisel tends to improve the operation of both functions. The chisel opens a furrow which permits the disc to cut vegetation more efficiently and with less weight on the disc carriage. At the same time the chisel, projecting beyond the radius of the disc, provides a break in the soil against which the sharpened edges of the disc can more efficiently cut.

According to the present disclosure, the chisel is mounted on the disc in such a manner that it can be adjusted radially to regulate its depth of penetration and is further provided with means whereby an auxiliary chisel may be attached thereto to further modify its action to accommodate to moisture content and other soil conditions. While the accompanying drawings and description are directed to a flat planar disc, it is to be understood that the invention is equally applicable to concave or other discs.

It is, therefore, an object of this invention to provide a soil-working device combining the functions and advantages of a disc harrow and subsoil chisels.

Another object is to provide a device of the type set forth wherein the disc and chisel mutually enhance the action of each other.

Still another object of the invention is to provide a combined disc harrow and chisel adapted to be regulated to change the depth and nature of the subsoil chisel action.

A further object is to provide a tool of the type set forth that is extremely simple and economical to manufacture yet reliable and efficient in operation.

Still further objects and advantages will become apparent to those skilled in the art as the description proceeds with reference to the accompanying drawings wherein:

FIG. 1 is a side elevational view of one preferred embodiment of the invention;

FIG. 2 is a fragmentary sectional view taken along the line 2—2 of FIG. 1;

FIG. 3 is a fragmentary elevational view of a portion of another embodiment of the invention; and FIG. 4 is a fragmentary view of the peripheral portion of a still further embodiment.

Referring first to FIG. 1, numeral 2 indicates a harrow disc of a conventional configuration having a square or other opening 4 at its center for mounting in the usual manner on a disc harrow shaft. The disc 2 is of substantially circular shape having a peripheral cutting edge 6 provided with equally spaced notches or concavities 8 therein of substantial peripheral extent. Thus far the disc 2 is more or less conventional and may be either a flat disc or a concave disc, as is well known.

A plurality of chisel members 10 are secured to the disc 2 by being bolted to one face thereof to extend laterally of the disc through the central portion of the notches or concavities 8. Each chisel 10, which may be referred to as a subsoil tillage member, is provided with a sharpened leading edge 12 and a forwardly directed hooked portion 14 consitituting a soil working portion at its outermost end.

FIG. 2 shows the manner in which the chisels are secured to the disc 2 wherein the disc is provided with a series of openings 16 therethrough in line with the central radius through the notches 8. A plurality of bolts 18, extending through aligned openings in the chisels 10 and disc 2, secure the assembly in the illustrated relationship. It is preferred that a backing plate 20 be interposed between the bolts and the disc 2 in the side of the disc opposite the chisels 10 to further stiffen the apparatus and to provide for more secure clamping. As shown by dotted lines in FIG. 1, the chisel 10 may be secured to the disc 2 in the full line position or may be moved radially outwardly to the dotted line position by employing different bolt holes to thus project the working portions of the chisels farther outwardly than the normal circular periphery of the disc 2. Even in their innermost positions of adjustment, the chisels 10 extend outwardly at least to the circular periphery of the disc 2 and preferably a slight distance therebeyond.

FIG. 3 shows an auxiliary chisel element 22 bolted to the outer face of the chisel 10 and provided with an outer working portion 24 radially outwardly of and disposed laterally with regard to the working portion 14 of the chisel 10. By means of such an attachment, the effective depth of penetration of the chisel is increased and a wider zone of action is provided whereby to effect a different type of subsoil working than is accomplished with the chisel 10 alone. The working portion 24 is an integral end of attachment 22 that is twisted to extend laterally of the plane of the disc to thus provide a broad chisel edge.

FIG. 4 illustrates a further type of attachment 26 bolted to the chisel 10 and having a working portion 28 at its outer end similar in shape to the working portion 14. However, this attachment permits extending the effective depth of working of the chisel to a subsoil level greater than that possible with the chisel 10 alone.

The soil working implement made up of combined discs and chisels as disclosed herein is operated in the usual and normal manner by pulling the same over the ground in such direction that the discs roll forwardly, toward the left as seen in FIG. 1. During those intervals when only the cutting edge 6 of a disc is lowermost, the action is simply that of a disc harrow for a short distance. However, when the forward end of a cutting edge portion 6 is lowermost, the juncture between that edge and a notch 8 serves somewhat as a fulcrum or pivotal center for the working portion 14 of the associated chisel to force the same deep into the soil and rearwardly. This action is repeated for each chisel on each disc and it has been found that a more efficient soil-working can be accomplished with this novel combination than was previously possible.

While the specific embodiments shown are described as being "bolted" together and the tillage attachments are referred to as "chisels," it is to be understood that the attachments may be riveted, welded or otherwise secured to the disc and/or each other and that they may take other forms not properly described as "chisels."

While a limited number of embodiments of the invention have been shown and described herein, it is to be understood that the same are merely exemplary and that the invention may be embodied in other forms falling within the scope of the appended claim; for example, two discs may be provided for each unit and the chisels sandwiched or clamped between the discs.

I claim:

A soil-working device comprising: a circular cutting disc having a circular periphery adapted to roll on the earth; a plurality of notches, not exceeding four, in the periphery of said disc, the peripheral extent of each notch being of the order of one-eighth the circumference of said disc; a soil cutting tillage member for each notch, each member being secured to said disc and extending radially thereof, substantially centrally of its notch, and extending outwardly beyond the circular periphery of said disc.

References Cited in the file of this patent

UNITED STATES PATENTS

| | | |
|---|---|---|
| 2,300,446 | Fidler | Nov. 3, 1942 |
| 2,477,662 | Seaman | Aug. 2, 1949 |
| 2,732,785 | Kleppe | Jan. 31, 1956 |
| 2,757,596 | Adels | Aug. 7, 1956 |
| 3,008,527 | Stohlmann | Nov. 14, 1961 |

FOREIGN PATENTS

| | | |
|---|---|---|
| 1,040,837 | France | May 27, 1953 |
| 1,074,307 | Germany | Jan. 28, 1960 |